United States Patent
Rico et al.

(10) Patent No.: US 11,689,080 B2
(45) Date of Patent: Jun. 27, 2023

(54) SUPERCRITICAL CO2 COOLED ELECTRICAL MACHINE

(71) Applicant: Siemens Energy, Inc., Orlando, FL (US)

(72) Inventors: Raul Ricardo Rico, Oviedo, FL (US); Christopher Lowry, McAdenville, NC (US); Patrick King Wah May, Ocoee, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 150 days.

(21) Appl. No.: 17/256,732

(22) PCT Filed: Jul. 5, 2019

(86) PCT No.: PCT/US2019/040694
§ 371 (c)(1),
(2) Date: Dec. 29, 2020

(87) PCT Pub. No.: WO2020/014084
PCT Pub. Date: Jan. 16, 2020

(65) Prior Publication Data
US 2021/0143707 A1    May 13, 2021

Related U.S. Application Data

(60) Provisional application No. 62/695,575, filed on Jul. 9, 2018.

(51) Int. Cl.
*H02K 9/10* (2006.01)
*F01K 25/10* (2006.01)
*H02K 7/18* (2006.01)

(52) U.S. Cl.
CPC ............. *H02K 9/10* (2013.01); *F01K 25/103* (2013.01); *H02K 7/1823* (2013.01);
(Continued)

(58) Field of Classification Search
CPC ...... H02K 9/10; H02K 7/1823; F01K 25/103; F05D 2210/12; F05D 2220/31; F05D 2220/76
See application file for complete search history.

(56) References Cited

U.S. PATENT DOCUMENTS 8,397,506 B1 * 3/2013 Wright ............... F02C 1/10
415/110
8,794,002 B2 * 8/2014 Held ............... F01K 7/165
60/671
(Continued)

FOREIGN PATENT DOCUMENTS

CN       102003285 A    4/2011
CN       104791204 A    7/2015
(Continued)

OTHER PUBLICATIONS

PCT International Search Report and Written Opinion dated Sep. 24, 2019 corresponding to PCT Application Mo. PCT/US2019/040694 filed Jul. 5, 2019.
(Continued)

*Primary Examiner* — Pedro J Cuevas
(74) *Attorney, Agent, or Firm* — Janet Diane Hood

(57) ABSTRACT

Systems and methods are provided to cool a heat producing component in an electrical machine system. The electrical machine includes a supercritical carbon dioxide ($SCO_2$) wherein the $SCO_2$ is a working medium of a heat exchanger that is arranged in the electrical machine system to cool a fluid that cools the heat producing component and/or wherein the $SCO_2$ directly cools at the heat producing component.

13 Claims, 1 Drawing Sheet

(52) U.S. Cl.
CPC ...... *F05D 2210/12* (2013.01); *F05D 2220/31* (2013.01); *F05D 2220/76* (2013.01)

(56) References Cited

U.S. PATENT DOCUMENTS

| | | | | |
|---|---|---|---|---|
| 8,893,499 | B2* | 11/2014 | Maier | H02K 5/161 |
| | | | | 60/647 |
| 9,118,226 | B2* | 8/2015 | Kacludis | F01K 11/00 |
| 9,410,451 | B2* | 8/2016 | Laing | F01K 23/10 |
| 9,695,715 | B2* | 7/2017 | Kalra | F28D 20/00 |
| 9,828,882 | B2* | 11/2017 | Numata | F01K 13/00 |
| 10,082,049 | B2* | 9/2018 | Lee | F01K 25/103 |
| 10,273,832 | B2* | 4/2019 | Cha | F01K 23/12 |
| 10,344,626 | B2* | 7/2019 | Cha | F01K 11/02 |
| 10,529,585 | B2* | 1/2020 | Manna | H01L 21/31116 |
| 10,801,788 | B2* | 10/2020 | Li | F28D 9/0037 |
| 10,934,895 | B2* | 3/2021 | Held | F01K 23/10 |
| 11,225,905 | B1* | 1/2022 | Holley | F01K 23/02 |
| 11,454,452 | B2* | 9/2022 | Dethier | F28D 7/1669 |
| 11,466,618 | B2* | 10/2022 | Lee | F02C 7/141 |
| 11,485,504 | B2* | 11/2022 | Thomassin | F02K 5/00 |
| 11,624,317 | B2* | 4/2023 | Holley | F02C 7/185 |
| | | | | 60/39.83 |
| 11,629,637 | B2* | 4/2023 | Holley | F02C 7/185 |
| | | | | 60/39.181 |
| 2009/0266075 | A1 | 10/2009 | Westmeier et al. | |
| 2011/0048002 | A1 | 3/2011 | Taylor et al. | |
| 2011/0100002 | A1* | 5/2011 | Muir | F24T 10/20 |
| | | | | 60/641.2 |
| 2011/0239650 | A1 | 10/2011 | Amedick et al. | |
| 2013/0098037 | A1* | 4/2013 | Maier | H02K 7/1823 |
| | | | | 60/647 |
| 2013/0180259 | A1* | 7/2013 | Stapp | F02C 1/10 |
| | | | | 60/773 |
| 2014/0150443 | A1* | 6/2014 | Laing | F01K 23/10 |
| | | | | 60/774 |
| 2014/0216034 | A1* | 8/2014 | Numata | F01K 25/103 |
| | | | | 60/670 |
| 2015/0233265 | A1 | 8/2015 | Rohden | |
| 2015/0315927 | A1 | 11/2015 | John et al. | |
| 2016/0146061 | A1* | 5/2016 | Kalra | F28D 20/02 |
| | | | | 60/671 |
| 2016/0248304 | A1 | 8/2016 | Andreson et al. | |
| 2016/0305289 | A1 | 10/2016 | Hwang | |
| 2016/0369658 | A1* | 12/2016 | Lee | F01K 7/16 |
| 2017/0122254 | A1 | 5/2017 | Urch et al. | |
| 2017/0204747 | A1* | 7/2017 | Cha | F01K 7/16 |
| 2017/0363002 | A1* | 12/2017 | Hwang | F01K 3/20 |
| 2018/0094547 | A1* | 4/2018 | Cha | F01K 11/02 |
| 2019/0211715 | A1* | 7/2019 | Park | C01B 3/02 |
| 2019/0366230 | A1* | 12/2019 | Casals | B01D 15/08 |
| 2020/0072560 | A1* | 3/2020 | Li | F28D 9/0006 |
| 2020/0141568 | A1* | 5/2020 | Dethier | F22B 1/06 |
| 2020/0355407 | A1* | 11/2020 | Ueda | F04B 53/16 |
| 2020/0386484 | A1* | 12/2020 | Dethier | F28D 7/06 |
| 2021/0013759 | A1* | 1/2021 | Torrey | H02K 3/02 |
| 2021/0164735 | A1* | 6/2021 | Byman | F28D 9/0043 |
| 2021/0404381 | A1* | 12/2021 | Lee | F01K 7/32 |
| 2022/0127009 | A1* | 4/2022 | Thomassin | F02K 5/00 |
| 2022/0275752 | A1* | 9/2022 | Holley | F01K 23/02 |
| 2022/0375636 | A1* | 11/2022 | Zhang | G21C 15/28 |
| 2022/0389841 | A1* | 12/2022 | Pryor | F02C 6/04 |
| 2022/0415527 | A1* | 12/2022 | Zhang | G21C 17/022 |

FOREIGN PATENT DOCUMENTS

| | | |
|---|---|---|
| CN | 104956075 A | 9/2015 |
| CN | 205583942 U | 9/2016 |
| CN | 106795833 A | 5/2017 |
| CN | 106870043 A | 6/2017 |
| CN | 107448246 A | 12/2017 |
| EP | 2233433 A1 | 9/2010 |
| EP | 2798159 A1 | 11/2014 |
| JP | 2013124666 A | 6/2013 |
| JP | 2013520597 A | 6/2013 |
| JP | 2015525841 A | 9/2015 |
| JP | 2018503337 A | 2/2018 |
| KR | 20160123662 A | 10/2016 |
| WO | 2013059038 A1 | 11/2018 |

OTHER PUBLICATIONS

Lijun Fang et al., Parameters Optimization of a Supercritical CO2 Partial Pre-cooling Brayton Cycle, School of Energy, Power and Mechanical Engineering, North China Electric Power University, Jan. 2018, vol. 32, Boading 071003, Hebei Province, China, No. 1, TK123, 1671-086X(2018)01-0007-04.

* cited by examiner

SUPERCRITICAL CO2 COOLED ELECTRICAL MACHINE

TECHNICAL FIELD

The present disclosure is directed, in general, to a cooling of electric machine, and more specifically to systems and method for a supercritical carbon dioxide ($SCO_2$,) cooled electric machine.

BACKGROUND

During the operation of an electric machine, components may generate heat. The generated heat reduces the efficiency and/or lifespan of the machine. A cooling system may be used in electric machines to keep the machine operating within an acceptable temperature range.

By way of example of an electric machine, an electric generator 10 is illustrated in FIG. 1. The generator 10 includes a stator 12 and a rotor 14 that rotates relative to the stator 12. The stator 12 includes a core 22 with windings 24 arranged thereon. At least a portion of the generator may be housed in a casing. In an electric generator, the typical cooling system includes at least one cooling medium i) air, ii) hydrogen and iii) water. The primary cooling configurations include i) air cooling for both the rotor and stator, ii) hydrogen cooling for both the rotor and stator, and iii) water cooling for the stator coils and hydrogen cooling for the rotor and stator core.

Air cooling may include indirect and/or direct cooling of a heat producing component. Ambient or cooled air may be circulated around or on components to reduce heat. Air cooling is not as effective and leads to a lower power density machine (kW/kg). For a given power output, the air-cooled machine is larger. While air cooling is less effective than water or hydrogen cooling it is also less complex.

Although hydrogen is an effective cooling medium, hydrogen cooled systems require special care. Hydrogen is flammable and when mixed with oxygen, explosive. To keep the hydrogen contained and to help maintain a proper gas pressure, the casing of the generator is reinforced in a closed loop cooling environment. This casing construction can increase the weight and cost of the generator. Complex auxiliaries are needed. For example, a seal oil system is provided between the rotor and casing for 1) maintaining hydrogen inside the generator; 2) preventing air and moisture from getting into the system; and/or 3) lubricating hydrogen gland seals. Other auxiliaries may include blowers to circulate gases, valves to regulate gas flow, pressure regulator to control pressure of the gases, gas driers to remove any water vapor that may get into the machine, temperature monitoring, gas purity monitoring, and scavenging medium for safely putting hydrogen in the generator and for safely removing hydrogen from the generator. While hydrogen is an effective cooling medium, it is costly in terms of auxiliary components. Furthermore, these components may add weight and increase the footprint.

Water may be used to directly cool components of the generator. The purity of the water must be maintained so that a voltage is not induced in the water that would cause a short in the generator. Also, parts of the generator must be sealed so that the water does not enter other parts of the machines. Auxiliaries, such as demineralizer to maintain water purity, driers, filters, pumps and heat exchangers are typically employed in a water-cooling system.

SUMMARY

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

A system comprising an electric machine and supercritical carbon dioxide ($SCO_2$) is provided. The electric machine includes at least one heat generating component.

The electric machine may include a heat exchanger to cool a fluid that cools at least one heat generating component, where the $SCO_2$ is a working medium of the heat exchanger and the working medium is heated during the heat exchange to form a heated working medium; the fluid may be air, water or hydrogen. The heated working medium may be discharged to the atmosphere, put in to a container, used as a coolant in a further component, or used as a working medium in a further component.

The $SCO_2$ may directly cool at least one heat generating component. A heated exhaust gas is formed, from the $SCO_2$, after cooling at least one heat generating component. By way of an egress conduit, the heated exhaust gas may be discharged to the atmosphere, put in to a container, used as a coolant in a further component, or used as a working medium in a further component.

The egress conduit may be arranged between the electric machine and a further component to conduct the heated working medium and/or the heated exhaust gas to the further component.

An ingress conduit may be arranged between the electric machine and the further component to conduct a discharged working fluid, being $SCO_2$, from the further component to the heat exchanger and/or to directly cool at least one heat generating component.

The ingress conduit and the egress conduit may be provided to form a closed loop between the electric machine and the further component.

The electric machine may be a dynamoelectric machine that includes a stator, and a rotor rotatable relative to the stator, where the stator and the rotor are heat generating components. At least one of the stator and rotor may be cooled by the heat exchanger or directly by the $SCO_2$.

DETAILED DESCRIPTION

Figure 1:
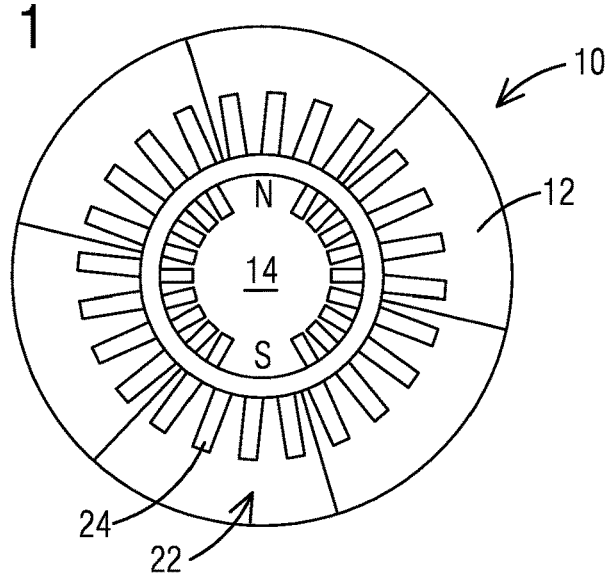
FIG. 1 is a diagram of an electric generator.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly unless expressly limited in some examples. For example, the terms "include" and "comprise," as well as derivatives thereof, mean inclusion without limitation. The singular forms "a", "an" and "the" are intended to include the plural forms as well unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element; or that the element is in contact with the further portion unless the context clearly indicates otherwise. Further, the phrase "based on" is intended to mean "based, at least in part, on" unless explicitly stated otherwise. Terms "about" or substantially" or like terms are intended to cover variations in a value that are within normal industry manufacturing tolerances for that dimension. If no industry standards are available, a variation of 20 percent would fall within the meaning of these terms unless otherwise stated. Ranges are understood to be inclusive of the starting and ending values unless otherwise stated.

An electric machine is any device that produces heat during operation and that may benefit from a reduction of heat of the heat generating components. The aspects described herein may be applied to any electric machine to reduce heat. A dynamoelectric machine is illustrated to describe the various aspects of the invention. It would be understood that the principles outlined using the dynamoelectric machine may be applied to other electric machines and that illustrations are not to limit the scope of the disclosure.

Figure 2:
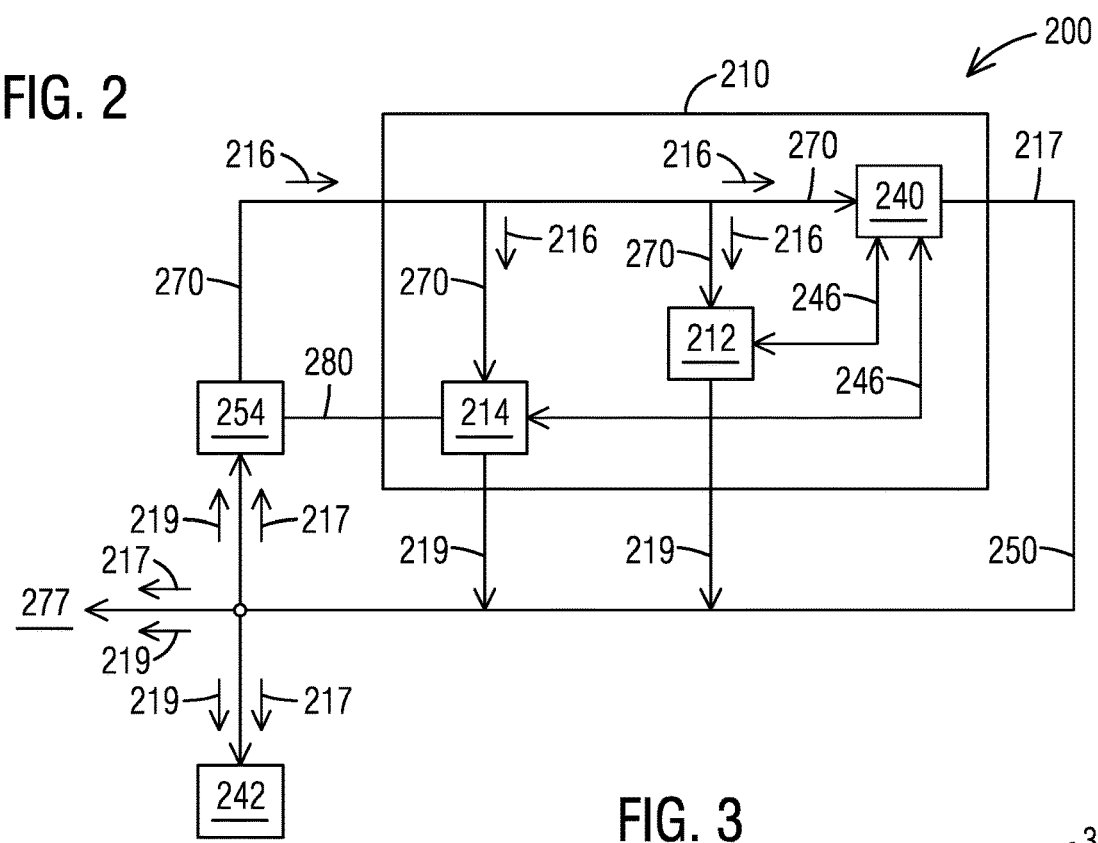
FIG. 2 illustrates a schematic view of a system that includes $SCO_2$, to cool heat generating components of a dynamoelectric system.

FIG. 2 illustrates a schematic view of a system 200 that includes a dynamoelectric machine and supercritical carbon dioxide ($SCO_2$,). The dynamoelectric machine 210 includes a plurality of heat generating components 212, 214. The heat generating components include a stator 212 and a rotor 214. The rotor 214 is rotatable relative to the stator 212. At least one of the stator and rotor is cooled by a heat exchanger or directly by the $SCO_2$.

The dynamoelectric machine 210 may include a heat exchanger 240 using $SCO_2$ 216 as a working medium of the heat exchanger 240. A fluid 246, for example, air, hydrogen, or water, is circulated in a closed looped environment. The fluid 246 is used to cool at least one of the heat generating components 212, 214. It would be understood that the heat generating components 212, 214 may each be cooled by different fluids. It would also be understood that more than one heat exchanger 240 may be employed. For example, each heat generating component may use a different heat exchanger 240. The heat exchanger 240 is arranged to cool the fluid 246 that has been heated during the cooling of the at least one heat generating components 212, 214. The working medium 216 is heated during this heat exchange. By way of an egress conduit 250, the heated working medium 217 may be discharged, contained, or used in a further component by an egress conduit 250. For example, the heated working medium 217 may be released into the atmosphere 277; may be stored in a container 242; may be used as a coolant in the further component 254; or may be used as a working medium in the further component 254. The egress conduit 250 may be arranged between the dynamoelectric machine 210 and the further component 254 to conduct the heated working medium 217 from the heat exchanger 240 to the further component 254. An ingress conduit 270 may be arranged between the dynamoelectric machine 210 and the further component 254; the ingress conduit 270 is configured to conduct a discharged working fluid, $SCO_2$, from the further component 254 to the heat exchanger 240. According to the illustration, the ingress conduit 270 and the egress conduit 250 are connected to the same further component 254. It would be understood that ingress conduit 270 may be connected to a first further component and the egress conduit 250 may connected to a second further component. It would further be understood the $SCO_2$ 216 may be supplied to the dynamoelectric machine 210 heat exchanger 240 by a container.

In an embodiment, a $SCO_2$ power cycle turbine that uses $SCO_2$ as a working medium is connected 280 to the dynamoelectric machine 210. For example, the $SCO_2$ power cycle turbine may be an Allam Cycle turbine. $SCO_2$. The turbine provides a rotational energy to the dynamoelectric machine. The ingress conduit 270 connects the $SCO_2$ power cycle turbine 254 to the dynamoelectric machine 210, to supply $SCO_2$ from the turbine 254 to the heat exchanger 240. As described above, the heated working medium 217 may be discharged, sequestered, or used in a further component by the egress conduit 250. The egress conduit 250 may connect the turbine 254 to the dynamoelectric machine 210 to conduct the heated working medium 217 of the heat exchanger 240 to the turbine 254. The internal energy of the $SCO_2$ having been increased by the heating may increase the efficiency of the turbine 254. The heated working medium 217 may be further heated, further increasing the internal energy, before being added to the turbine 254. In an embodiment, the ingress conduit 270 and the egress conduit 250 are connected to the $SCO_2$ power cycle turbine 254 creating a close loop for the $SCO_2$. The stage of the turbine where the ingress conduit 270 is connected may be different than the stage to where the egress conduit 250 is connected.

Using $SCO_2$ 216 as a working fluid in the heat exchanger 240 may increase the power density of the generator without increasing footprint and/or without adding additional auxiliaries.

The dynamoelectric machine 210 may use $SCO_2$ 216 as a coolant to directly cool at least one of the heat generating components 212, 214. By way of an egress conduit 250, a heated exhaust gas 219, formed by directly cooling the heat generating component 212, 214 by the SCO2, may be discharged; may be contained; or may be used in a further component. For example, the heated exhaust gas 219 may be released into the atmosphere 277; may be stored in a container 242; may be used as a coolant in the further component 254; or may be used as a working medium in the further component 254. The egress conduit 360 may be arranged between the dynamoelectric machine 210 and the further component 254 to conduct the heated exhaust gas 219 to the further component. An ingress conduit 270 may be arranged between the dynamoelectric machine and the further component 254, the ingress conduit configured to conduct a discharged working fluid from the further component to the dynamoelectric machine. According to the illustration, the ingress conduit 270 and the egress conduit 250 are connected to the same further component 254. It would be understood that ingress conduit 270 may be connected to a first further component and the egress conduit 250 may connected to a second further component. It would further be understood the $SCO_2$ 216 may be supplied to the dynamoelectric machine 210 by a container.

In an embodiment, a $SCO_2$ power cycle turbine that uses $SCO_2$ as a working medium is connected 250 to the dynamoelectric machine 210, the turbine providing rotational energy to the dynamoelectric machine. For example, the $SCO_2$ power cycle turbine may be an Allam Cycle turbine. $SCO_2$. The ingress conduit 270 connects the $SCO_2$ power cycle turbine 254 to the dynamoelectric machine 210, to supply $SCO_2$ from the turbine 254 to directly cool at least one of the heat generating components. The heated exhaust gas 219 may be discharged, sequestered, or used in a further component. The egress conduit 250 may connect the turbine 254 to the dynamoelectric machine 210 to conduct heated exhaust gas 219 to the turbine 254. The internal energy of the $SCO_2$ having been increased by the heating may increase the efficiency of the turbine 254. The heated exhaust gas 219 may be further heated, further increasing the internal energy, before being added to the turbine 254. The ingress conduit 270 and the egress conduit 250 may be connected to the $SCO_2$ power cycle turbine 254 creating a close loop for the $SCO_2$. The stage of turbine where the ingress conduit 270 is connected may be different than the stage to where the egress conduit 250 is connected.

Unlike water and hydrogen, $SCO_2$ may directly contact the copper used in the stator windings. This may allow for a reduced caused of stator windings when producing cooling channels. Furthermore, by directly cooling at least one of the heat generating components 212, 214, a reduction of auxiliaries may be realized. For example, $SCO_2$ is not conductive like water and would not need demineralization auxiliaries. A seal oil system needed by hydrogen cooling may be eliminated. It may be possible to eliminate other auxiliaries as the $SCO_2$ is not in a close loop within the generator 210.

The combination of $SCO_2$ 216 as a working medium of a heat exchanger and $SCO_2$ 216 as a coolant to directly cool at least one of the heat generating components may be employed. For example, the rotor may be directly cooled by $SCO_2$ 216 and the stator may be cooled by a fluid that is cooled by the heat exchanger. It would be understood that a reverse configuration may be used where the stator may be directly cooled by $SCO_2$ 216 and the rotor may be cooled by a fluid that is cooled by the heat exchanger. It would be further understood that a configuration only using the heat exchanger 240 to cool at least one of the heat generating components 212, 214 may be employed or conversely, a configuration only using $SCO_2$ 216 may be used as a coolant to directly cool at least one of the heat generating components may be employed.

Figure 3:
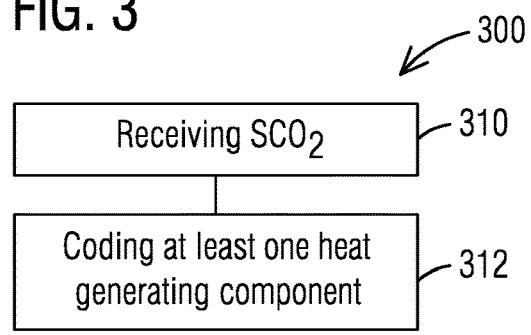
FIG. 3 illustrates a method of a system that includes $SCO_2$, to cool heat generating components of a dynamoelectric system.

A method is illustrated in FIG. 3. According to the method 300 supercritical carbon dioxide ($SCO_2$) is received by an electric machine comprising a plurality of heat generating components (310). The SCO2 may be received from a container or from a further component. The further component may be a SCO2 power cycle turbine.

At least one of the heat generating components is cooled (312) from a heat exchanger using the $SCO_2$ as a working medium or by using $SCO_2$ to directly cool at least one of the heat generating components.

When the $SCO_2$ is a working medium of a heat exchanger, the fluid used of cool the stator/and or the rotor may be air, water or hydrogen.

The heated working medium of the heat exchanger and/or the heated exhaust gas may be discharged to the atmosphere, may be sequestered, may be used as a coolant in a further component, or may be used as a working medium in a further component. The further component may be a SCO2 power cycle turbine.

A closed loop may be provided between the further component and electric machine so $SCO_2$ is received by the electrical machine and after the cooling of at least one of the heat generating components the heated working medium and/or the heated exhaust is returned to the further component as a working medium.

The heated working medium and/or the heated exhaust gas may be further heated before adding the heated working medium to the further component as a working medium.

The electric machine may be a generator comprising a rotor and a stator as the heat generating components.

In a further embodiment, a dynamoelectric machine may be provided that includes $SCO_2$ within an enclosed casing around the rotor and the stator. In this way $SCO_2$ surrounds the stator and rotor. A heat exchanger may be provided to extract the heat from the $SCO_2$ as it is heated by the stator and the rotor.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

Various technologies that pertain to arrangement and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

We claim:

1. A system comprising:
a heat exchanger comprising a supercritical carbon dioxide ($SCO_2$) as a working medium,
a generator comprising a stator, and a rotor rotatable relative to the stator, the stator and the rotor are heat generating components; and
a closed fluid loop between the at least one heat generating component and the heat exchanger, the heat exchanger arranged to receive a fluid from the at least one heat generating component to be cooled by the heat exchanger, and transmit the cooled fluid to the heat generator component,
wherein the working medium is heated during the heat exchange to form a heated working medium.

2. The system according to claim 1,
wherein the $SCO_2$ is the working medium of a heat exchanger, and
wherein the fluid is air, water or hydrogen.

3. The system according to claim 2,
wherein a heated working medium of the heat exchanger is discharged to the atmosphere.

4. The system according to claim 2,
wherein a heated working medium of the heat exchanger is sequestered.

5. The system according to claim 2,
wherein a heated working medium of the heat exchanger is used as a working medium in a further component in the system.

6. The system according to claim 1, comprising:
an ingress conduit arranged between the generator and the further component, the conduit configured to conduct a discharged working fluid from the further component to the heat exchanger as the working medium of the heat exchanger.

7. The system according to claim 6, comprising
an $SCO_2$ power cycle turbine connected to the generator, the turbine providing rotational energy to the generator, wherein the $SCO_2$ working medium of the heat exchanger is provided by the $SCO_2$ power cycle turbine via the ingress conduit connected to the heat exchanger.

8. A method comprising:
transmitting a fluid in a closed loop, wherein the fluid flows from component of a generator, subsequently through a heat exchanger where the fluid is cooled, and the cooled fluid flow to the component; and
cooling the generator component with the cooled fluid,
wherein when component is a stator and/or a rotor,
wherein $SCO_2$ is a working medium of the heat exchanger.

9. The method according to claim 8,
discharging a heated working medium of the heat exchanger to the atmosphere.

10. The method according to claim 8,
sequestering a heated working medium of the heat exchanger.

11. The method according to claim 8, comprising
conducting a discharged working fluid from a further component, as a working medium of the heat exchanger, to the heat exchanger by an ingress conduit arranged between the generator and the further component.

12. The method according to claim 8, comprising
conducting a heated working medium of the heat exchanger to a further component from the heat exchanger by an egress conduit arranged between the generator and the further component.

13. The method according to claim 12, comprising
further heating the heated working medium before adding the heated working medium to the further component as a working medium.

\* \* \* \* \*